Patented June 12, 1951

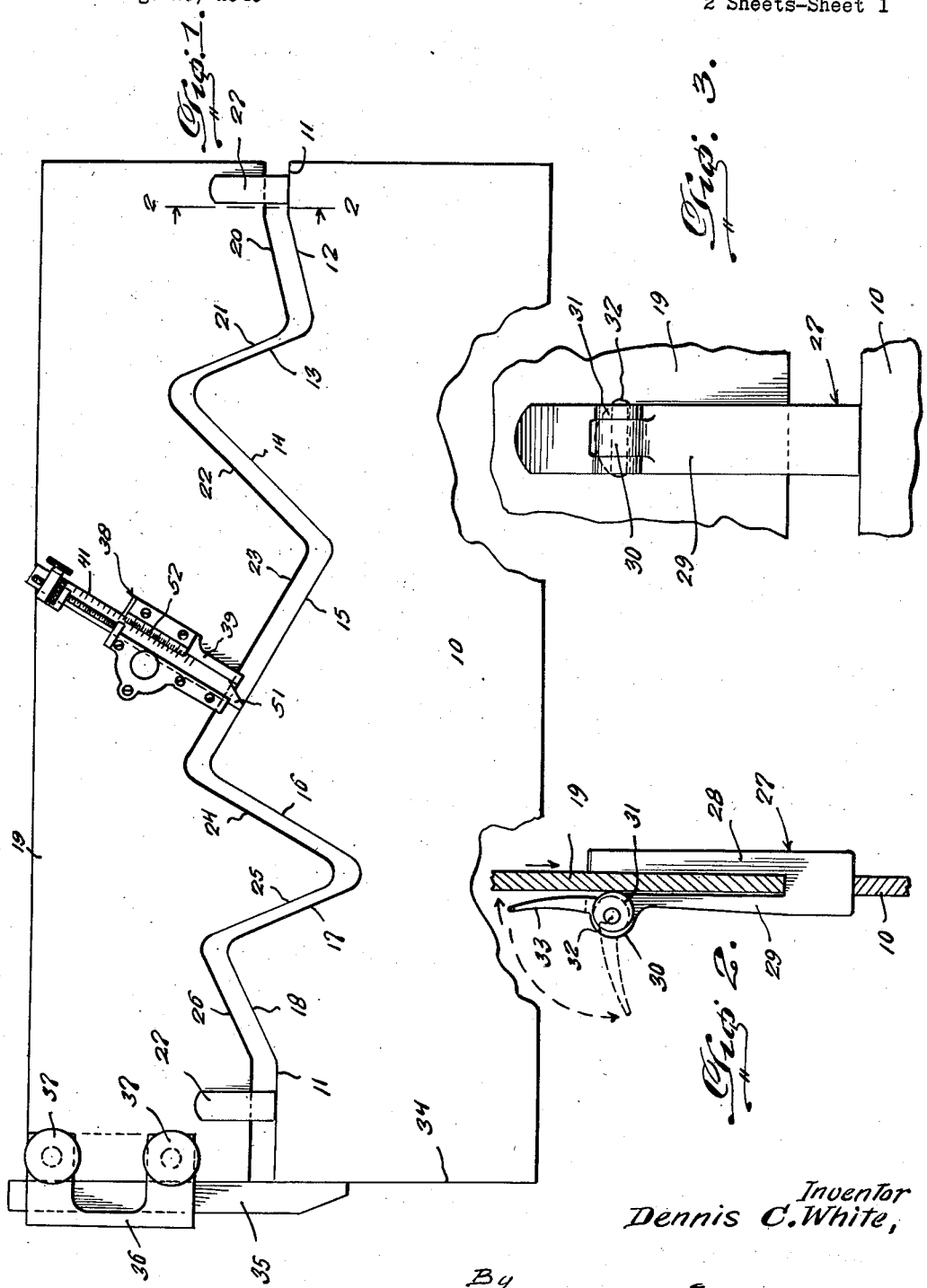

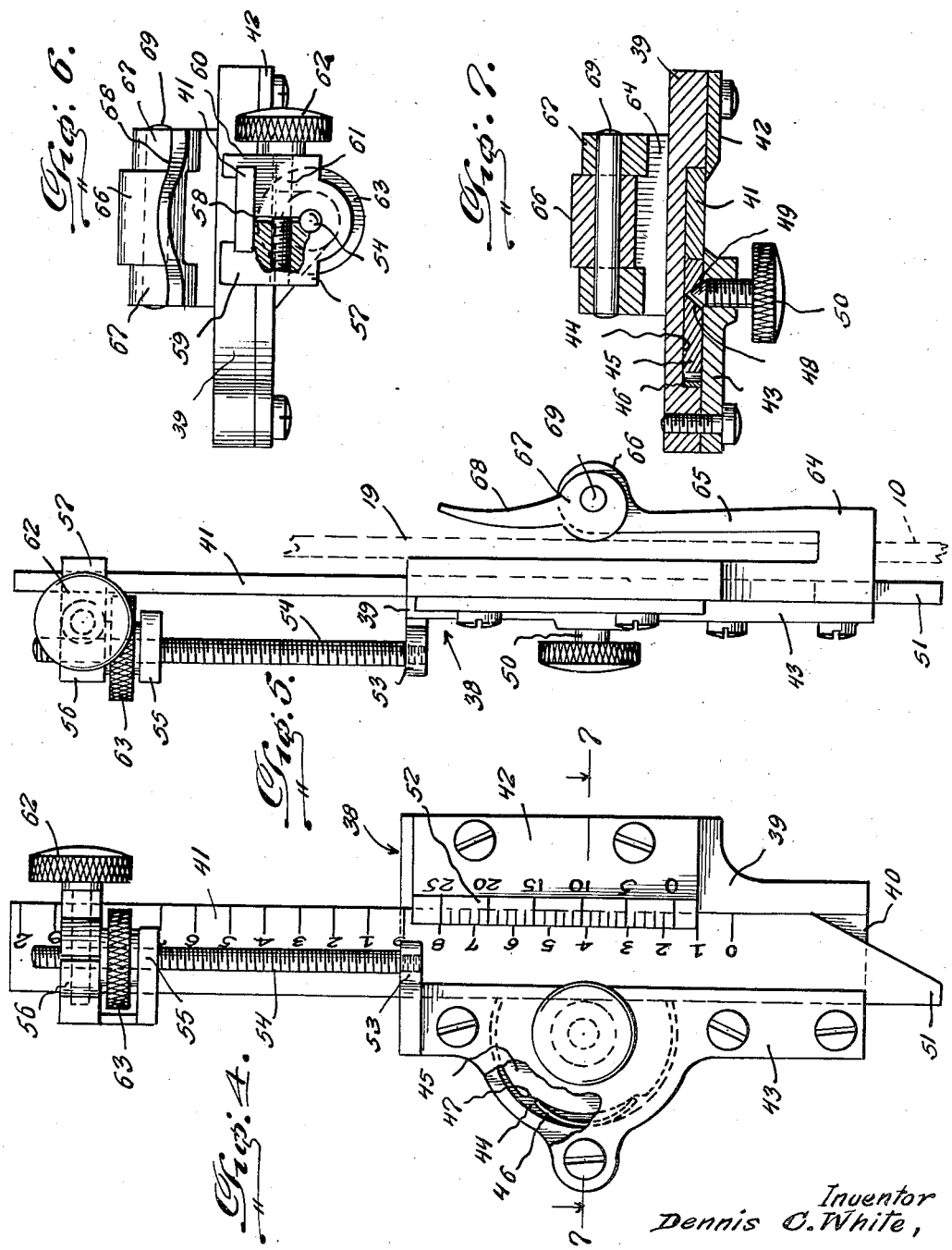

2,556,381

UNITED STATES PATENT OFFICE 2,556,381

APPARATUS FOR MEASURING PROFILES AND CONTOURS

Dennis C. White, Akron, Ohio

Application August 23, 1946, Serial No. 692,671

4 Claims. (Cl. 33—174)

1

This invention relates to an apparatus for measuring the amount of material to be removed from an object to form various angularly related surfaces on said object. More particularly, it has to do with the spacing members of a known dimension for supporting a template provided with a plurality of angularly related edges in spaced aligned relation with respect to the angularly disposed surfaces of the work in process of formation and the cooperating distance measuring means for enabling the computation of the perpendicular distance between one of said surfaces and a corresponding template edge in relation to the known dimension of the spacing members.

In my Patent No. 2,319,569 there is described and claimed a method and means for measuring contours and profiles which, broadly stated, comprises forming one or more planar surfaces on an object to be provided with a desired contour to serve as base or standard surfaces, placing one or more spacing members of known dimension on a template of the proper shape, placing the assembled template and spacing members on the object with the spacing members in contact with the standard surfaces formed on the object, computing the perpendicular distance between each individual edge of the template and the corresponding surface to be formed on the object by multiplying the proper trigonometric function of the angle of each surface with respect to a common surface or line for all surfaces with the known dimension of the spacing members, and cutting each planar surface on the proper angle until the proper perpendicular distance between the template edge and surface is reached. After all surfaces have been similarly formed, the template will fit the finished contour perfectly. Afterward, the proper finish may be given the fillets and ridges between the surfaces.

The present invention is concerned with a modified form or construction of the spacing members and of the cooperating distance measuring means for enabling the computation of the perpendicular distance between one of the angularly disposed surfaces of the work in process of formation and a corresponding template edge in relation to the known dimension of the spacing members.

An object of the present invention is to provide an apparatus for measuring the amount of material to be removed from an object to form various angularly related surfaces on said object wherein each of the spacing members of

2 known dimension include a spaced means for embracing opposite faces of an edge of the template and a means in association therewith for positively urging the edge of the template into a fixed position within said spaced means and ultimately locking same in such position.

Another object of the present invention is to provide an apparatus for measuring the amount of material to be removed from an object to form various angularly related surfaces on said object in which the distance measuring means includes a measuring element mounted for longitudinal slidable movement and an actuating mechanism in association therewith for causing such movement and positively locking said element in any prescribed position to which it has been moved.

A further object of the present invention is to provide an apparatus for measuring the amount of material to be removed from an object to form various angularly related surfaces on said object in which the distance measuring means includes a spaced means for embracing opposite faces of an edge of the template and a means in association therewith for positively urging the edge of the template into a fixed position within said spaced means and ultimately locking same in such position.

Other objects and advantages of the invention will become apparent from the following description in conjunction with the accompanying drawings, wherein:

Figure 1 is a front elevational view, with parts broken away, showing an irregular surface being measured by the apparatus of the present invention.

Figure 2 is a sectional side elevational view taken on the line 2—2 of Figure 1 of a spacing member for supporting the template in spaced aligned relation with respect to the angularly disposed surfaces of the work.

Figure 3 is an end elevational view of the spacing member shown in Figure 2.

Figure 4 is an enlarged front elevational view of the distance measuring means shown in Figure 1.

Figure 5 is an end elevational view of the measuring means shown in Figure 4.

Figure 6 is a plan view of the measuring means shown in Figure 4.

Figure 7 is a sectional view taken on the line 7—7 of Figure 4.

Referring to Figure 1 of the drawings, the numeral 10 indicates the bed of a lathe having a plurality of standard surfaces 11, and being provided with seven angularly related planar surfaces 12 through 18 inclusive. A template 19 having the desired contour comprising angularly related edges 20 through 26 inclusive is arranged in spaced and complemental relation with the angularly planar surfaces 12 to 18 inclusive of the bed respectively and is supported upon the standard surfaces 11 of the bed by means of a plurality of spacing members 27 of known dimension. Since the structure of each of the spacing members is the same, only one will be described in detail.

Each of the spacing members 27, Figures 2 and 3, comprise a solid base portion of known height and projecting upwardly therefrom is a pair of spaced legs 28 and 29, the latter leg being provided with an apertured ear 30 projecting from its exterior face thereof. A cam member 31 is pivotally mounted in the ear 30 by means of a pin 32, the said member being provided with a handle 33. As shown in Figure 2, the opposite sides adjacent an edge of the template 19 are embraced by the spaced legs 28 and 29, and the edge of the template is in contact engagement with the base portion intermediate such spaced legs and supported thereon. The template 19 is locked in such position through the intermediacy of the cam member 31 having its surface in engagement with the complemental side face of said template. When it is desired to withdraw the template 19 from the spacing member 27, the handle 33 of the cam member 31 is moved from the full line position in Figure 2 to the dotted line position of such figure. With the initial movement of the handle 33 from the full line position to the dotted line position the cam member 31 simultaneously causes the template 19 to be shifted vertically out of its supporting engagement with the base portion intermediate the spaced legs 28 and 29 of the spacing member. This vertical shifting of the template continues until the cam member 31 exerts only a slight bearing contact upon the complemental side of the template, whereupon the template may be readily withdrawn from the spacing member. For reinsertion of the template within the spacing member, the handle 33 is moved to the full dotted line position of Figure 2, the lower edge of the template 19 is then inserted between the spaced legs 28 and 29 constituting the spaced means for embracing opposite faces of an edge of the template, and the handle 33 of the cam member 31 is moved from the dotted line position to the full line position of Figure 2. The latter movement of the handle 33 causes the cam member 31 to be shifted into contacting engagement with the complemental side of the template to thereby urge the edge of the template into conacting engagement with the base portion intermediate the spaced legs 28 and 29 and ultimately lock same in such position.

At least one side 34 of the bed 10 is finished to also serve as a base or standard side. An endwise aligning member or stop 35 is preferably detachably and adjustably secured to one end of the template in a suitably channeled guideway 36 shown clamped to the template end by a pair of thumb screws 37. The stop 35 is adapted to abut the finished side 34 of the bed 10 to place the template in the same relative transverse position on the bed each time the template is placed thereon for a trial measurement.

A distance measuring means generally indicated by the numeral 38 is cooperatively mounted on the template 19 for enabling the computation of the perpendicular distance between one of the angularly disposed surfaces of the bed 10 in process of formation and a corresponding template edge in relation to the known dimension of the spacing members 27. As shown in Figure 1, the distance measuring means is mounted on the angular edge 23 of the template 19 in perpendicular relation with the related or complemental angular planar surface 15 of the bed 10.

The distance measuring means generally indicated by the numeral 38 comprises a body member 39 provided with a longitudinal groove 40 in which is slidably mounted a measuring element 41, the said element being retained in position in said groove by retaining plates 42 and 43 secured by screws to the outer face of the body member 39 and having portions, Figure 7, partially overlying the measuring element 41. A side wall of the longitudinal groove 40 is cut away so as to form a recess 44, Figures 4 and 7, for the reception therein of a generally semi-circular shaped holding member 45 adapted to engage the side edge of the measuring element 41, said holding member being normally maintained in resilient engagement with the cooperating side edges of the measuring element 41 by an arcuate spring 46 positioned between the edge thereof remote from the measuring element 41 and the complemental wall of the recess in the body member, a notch 47 being provided in said edge of the holding member for the accommodation of said spring. For more positively retaining the holding member 45 in engagement with the measuring element 41, a conical indentation 48 is provided in one face of said member to receive the conical end 49 of a screw 50 threaded into the overlying plate 43. It is to be noted that the movement of the conical end of the screw 50 into engagement with one wall of the conical indentation 48 of the holding member 45 produces a camming or wedging action therebetween, as a result of which the holding member is forced into tight or binding engagement with the adjacent side wall of the measuring element 41.

The measuring element 41 carries a scale calibrated similarly to a ruler, one end of which is beveled along one edge to provide a surface engaging end 51. The edge of the portion of the plate 42 overlying the measuring element 41 is beveled, and adjacent such edge is provided with a vernier 52. The vernier and measuring element are suitably calibrated whereby measurements may be accurately read to one-thousandth of an inch. The measuring member and vernier read zero when the end 51 is even with the inside surface of the body member 39.

The retainer plate 43 is provided with a lug 53 to which is secured, as by being threaded therein, one end of a threaded rod 54 which forms part of an actuating mechanism for causing longitudinal sliding movement of the measuring element 41, the other end of said rod passing loosely through a pair of spaced parallel apertured ears 55 and 56 carried by a supporting member 57 adjustably mounted on the measuring element 41. The base portion of the supporting member 57 is split as at 58 and provided with oppositely disposed clamping jaws 59 and 60 for embracing opposite side edges of the measuring element 41, said jaws being drawn together by means of a screw 61 passing freely through one of said jaws and being threaded into the other. The screw 61 is provided with a knurled head 62 which facilitates manual rotation thereof to cause movement of the jaws into and out of clamping engagement with the side edges of the measuring element 41. Threaded on the rod 54 and confined between the ears 55 and 56 is a knurled nut 63 which upon being manually rotated in one direction or the other, travels lengthwise of said rod and by engagement with the inner face of one or the other of said ears, causes corresponding longitudinal movement of the measuring element 41.

The body member 39 is also provided with a channel shaped portion 64 having a wing or plate 65 bent upwardly to form a spaced means for embracing opposite faces of an edge of the template 19 and supporting same therein. The upper end of the plate 65 is provided with an apertured ear 66 projecting from its exterior face thereof in which is pivotally mounted a cam member 67 having a handle 68 by means of a pin 69. As shown in Figure 5, the opposite sides adjacent an edge of the template 19 are embraced by the channel portion 64 and the plate 65 and the edge of the template is in contacting engagement with the bottom of the channel portion 64. The template 19 is locked in such position through the intermediacy of the cam member 67 having its surface in engagement with the complemental side face of the template. It will be apparent that by pulling the handle 68 downwardly the cam member will cause the template 19 to be moved vertically and away from the bottom of the channel portion 64, to thereby free the locking engagement of the cam member with a side of the template and permit its withdrawal therefrom.

In operation of the distance measuring means as thus described, the knurled nut 63 is manually rotated in the proper direction to cause corresponding longitudinal movement of the measuring element 41. When the nut has been rotated to an extent sufficient to effect the desired corresponding longitudinal movement of the measuring element 41, the screw 50 is manually rotated until the conical end thereof is in tight engagement with the conical indentation 48 of the holding member 45, to thereby lock the measuring element 41 in its adjusted position. For a further adjustment of the measuring element 41, the screw 50 is manually rotated in the opposite direction to an extent such that the conical end of the screw is in engagement with one wall of the conical indentation 48 of the holding member 45, the position shown in Figure 7, whereupon the knurled nut 63 is rotated in the proper direction and to the extent sufficient to effect the desired corresponding longitudinal movement of the measuring element 41, and the screw 50 then rotated in the reverse direction to effect locking of the measuring element.

What is claimed is:

1. In an apparatus for measuring the amount of material to be removed from an object to form variously angularly related surfaces on said object, a template having a plurality of angularly related edges, a plurality of spacing members of known dimension attachable to said template and respectively engageable with guide surfaces on said object to space the template a known distance from the guide surfaces on said object, and a distance measuring means having a measuring element provided with a surface engaging portion and mounted on an edge of said template so as to maintain the line of measurement of said measuring element perpendicular to said template edge whereby the perpendicular distance between said template edge and surface may be measured in relation to the known dimension of said spacing member, said distance measuring means embodying a body member provided with a longitudinal groove, a side wall of said groove being cut away so as to form a recess, said measuring element being slidably mounted within said groove, a holding member resiliently mounted within said recess for normally maintaining the body member in engagement with the cooperating side edge of the measuring element, means bearing on a face of said holding member for forcing the latter into tight engagement with the adjacent side wall of said measuring element, and actuating mechanism including a supporting member mounted on said measuring element and operatively connected to said body member and rotatable means operatively connected to said supporting member for causing longitudinal movement of said measuring element.

2. In an apparatus for measuring the amount of material to be removed from an object to form variously angularly related surfaces on said object, a template having a plurality of angularly related edges, a plurality of spacing members of known dimension attachable to said template and respectively engageable with guide surfaces on said object to space the template a known distance from the guide surfaces on said object, and a distance measuring means having a measuring element provided with a surface engaging portion and mounted on an edge of said template so as to maintain the line of measurement of said measuring element perpendicular to said template edge whereby the perpendicular distance between said template edge and surface may be measured in relation to the known dimension of said spacing member, said distance measuring means embodying a body member provided with a longitudinal groove, a side wall of said groove being cut away so as to form a recess, said measuring element being slidably mounted within said groove, a holding member having a conical indentation in a face thereof resiliently mounted within said recess for normally maintaining the body member in engagement with the cooperating side edge of the measuring element, a rotatable screw and having a conical end in engagement with a wall of the conical indentation for forcing the holding member into tight engagement with the adjacent side wall of said measuring element, and actuating mechanism including a supporting member mounted on said measuring element, a fixed threaded rod connecting said supporting member to said body member, a pair of spaced parallel apertured ears loosely mounted on said rod and carried by said supporting member, and a rotatable nut mounted on said rod intermediate said apertured ears for causing longitudinal movement of said measuring element.

3. In an apparatus for measuring the amount of material to be removed from an object to form variously angularly related surfaces on said object, a template having a plurality of angularly related edges, a plurality of spacing members of known dimension attachable to said template and respectively engageable with guide surfaces on said object to space the template a known distance from the guide surfaces on said object, and a distance measuring means having a measuring element provided with a surface engaging portion and mounted on an edge of said template so as to maintain the line of measurement of said measuring element perpendicular to said template edge whereby the perpendicular distance between said template edge and surface may be measured in relation to the known dimension of said spacing member, said distance measuring means embodying a body member having said measuring element mounted for longitudinal slidable movement therein, a supporting member mounted on said measuring element and operatively connected to said body member, the base portion of said supporting member being split and having oppositely disposed clamping jaws for embracing opposite side edges of the measuring element, and means for causing movement of the jaws into and out of clamping engagement with the side edges of the measuring element.

4. In an apparatus for measuring the amount of material to be removed from an object to form variously angularly related surfaces on said object, a template having a plurality of angularly related edges, a plurality of spacing members of known dimension attachable to said template and respectively engageable with guide surfaces on said object to space the template a known distance from the guide surfaces on said object, and a distance measuring means having a measuring element provided with a surface engaging portion and mounted on an edge of said template so as to maintain the line of measurement of said measuring element perpendicular to said template edge whereby the perpendicular distance between said template edge and surface may be measured in relation to the known dimension of said spacing member, said distance measuring means embodying a body member having said measuring element mounted for longitudinal slidable movement therein, a supporting member adjustably mounted on said measuring element and operatively connected to said body member, the base portion of said supporting member being split and having oppositely disposed clamping jaws for embracing opposite side edges of the measuring element, and means embodying a threaded screw passing freely through one of said jaws and being threaded into the other for causing movement of the jaws into and out of clamping engagement with the side edges of the measuring element.

DENNIS C. WHITE.

REFERENCES CITED

The following references are of record in the file of this patent:

UNITED STATES PATENTS

| Number | Name | Date |
| --- | --- | --- |
| 781,524 | Humpage | Jan. 31, 1905 |
| 848,387 | Nielsen | Mar. 26, 1907 |
| 867,556 | Campbell | Oct. 1, 1907 |
| 965,312 | Meeker | July 26, 1910 |
| 1,231,934 | Packett | July 3, 1917 |
| 1,379,116 | Malloy | May 24, 1921 |
| 1,389,486 | Brewer | Aug. 30, 1921 |
| 1,425,027 | Lustrik | Aug. 8, 1922 |
| 1,524,474 | Buick | Jan. 27, 1925 |
| 1,949,280 | Lester | Feb. 27, 1934 |
| 2,175,650 | Schaber | Oct. 10, 1939 |
| 2,256,030 | Lipani | Sept. 16, 1941 |
| 2,319,569 | White | May 18, 1943 |

FOREIGN PATENTS

| Number | Country | Date |
| --- | --- | --- |
| 162,048 | England | Apr. 18, 1921 |